United States Patent [19]

Hannappel

[11] Patent Number: 4,687,447
[45] Date of Patent: Aug. 18, 1987

[54] ALL TERRAIN CONVERSION SYSTEM FOR THREE-WHEELED VEHICLES

[76] Inventor: Gerald J. Hannappel, 708 W. Solano Dr., Phoenix, Ariz. 85013

[21] Appl. No.: 868,119

[22] Filed: May 27, 1986

Related U.S. Application Data

[63] Continuation of Ser. No. 717,521, May 28, 1985, abandoned.

[51] Int. Cl.⁴ ............................................. B63H 21/175
[52] U.S. Cl. .......................................... 440/11; 440/12; 114/123; 114/270; 280/10; 280/712
[58] Field of Search ................... 114/270, 123, 292; 440/11, 12; 280/293, 295, 10, 7.12, 12.12

[56] References Cited

U.S. PATENT DOCUMENTS 3,561,777  2/1971  Geis ........................... 280/7.12
4,092,945  6/1978  Ankert et al. ............. 280/12.12
4,285,674  8/1981  Chew ............................ 440/12

FOREIGN PATENT DOCUMENTS

743359  9/1966  Canada ........................... 114/123
51959   7/1911  Fed. Rep. of Germany ..... 440/12
919321  3/1947  France ............................ 440/12

Primary Examiner—Joseph F. Peters, Jr.
Assistant Examiner—Thomas J. Brahan
Attorney, Agent, or Firm—Cahill, Sutton & Thomas

[57] ABSTRACT

Structurally integrated equipment is selectively, individually or conjointly detachably attachable to a three-wheeled vehicle for preventing rearward tipover, carrying cargo, rendering the vehicle waterborne, enhancing travel over snow or providing power takeoff. Supports extending from the framework of the vehicle are adapted to receive and retain with quick disconnect fittings frame elements of each of the equipments. The frame elements may be adjustable to accommodate load variations and variances of the surface traversed.

4 Claims, 27 Drawing Figures

ALL TERRAIN CONVERSION SYSTEM FOR THREE-WHEELED VEHICLES

This is a continuation of application Ser. No. 717,521 filed May 28, 1985, now abandoned.

The present invention relates to vehicles and, more particularly, to integrated apparatus interchangeably attachable to a three-wheeled vehicle for converting the mode of use of the vehicle from one to another.

Three-wheeled vehicles, like that described in the U.S. Pat. No. 4,191,269, are essentially intended for recreational purposes and travel across improved or unimproved ground surfaces. Add-on equipment developed for such three-wheeled vehicles include a luggage carrier, as illustrated in U.S. Pat. No. 4,300,706. Vehicles having three in line wheels have been adapted by use of wide track wheels and demountably mountable traction belts for travel across ground terrain and snow, as described in U.S. Pat. No. 3,912,031.

Two-wheeled vehicles are inherently laterally unstable when stopped or moving at a slow speed. Various stabilizing apparatus has been developed to overcome such instability by employing laterally extending side wheels, as described in U.S. Pat. Nos. 3,700,059, 3,811,704 and 4,203,500. Moreover, two-wheeled vehicles are rearwardly tippable upon substantial rearward top heavy shift of weight or due to protuberances of terrain. Trailing wheeled members have been attached to such two-wheeled vehicles to limit the rearward tipping to a predetermined degree, as illustrated in U.S. Pat. Nos. 3,653,679, 3,700,059, 4,012,054 and 4,153,268.

Each of the above described ancillary equipments for vehicles is intended to serve a single function and little accommodation has been made for rapid and facile attachment and detachment. Moreover, none of the prior art is directed to a composite of equipments for interchangeably selectively adding or substituting equipments for different purposes or for travel upon land, water and snow surfaces.

The present invention is directed to an integrated system of equipments for converting a conventional three-wheeled vehicle into a landborne, waterborne or snowborne vehicle. These equipments are readily and facilely detachably attachable to common supports extending from the vehicle framework. Further ancillary equipments, adjustably detachably attachable individually or conjointly with other equipments, provide a source of power takeoff for motive means or to operate nonrelated apparatus. Conventional three-wheeled vehicles have no accommodation for transport of emergency equipments, rations or water; since such vehicles are often driven in inhospitable terrain, a cargo carrier may be detachably attached to the existing supports irrespective of which terrain traversing equipment is employed. Particularly for land travel at high speed or over steep terrain, rearward tilting constitutes a safety hazard. Such tilting may be limited by integratable rearwardly extending wheels.

It is therefore a primary object of the present invention to provide structurally integrated equipments selectively individually or conjointly detachably attachable to three-wheeled vehicles.

Another object of the present invention is to provide integrated support and frame elements for detachably attaching a variety of equipments to a three-wheeled vehicle.

Still another object of the present invention is to provide structurally integrated conversion equipments for converting a three-wheeled vehicle for travel across land, water or snow surfaces.

Yet another object of the present invention is to provide interchangeable equipments for travel of a three-wheeled vehicle across land, water or snow while retaining the conventional driving wheels as the source of motive power.

A further object of the present invention is to provide a rapidly detachably attachable flotation and power system for converting a three-wheeled vehicle to a waterborne craft.

A still further object of the present invention is to provide rapidly detachably attachable equipment for converting a three-wheeled vehicle into a snow mobile while retaining the capabilities for travel across bare land.

A yet further object of the present invention is to provide a structurally integratable power take off unit for a three-wheeled vehicle for powering detachably attachable equipments.

These and other objects of the present invention will become apparent to those skilled in the art as the description thereof proceeds.

The present invention will be described with greater specifity and clarity with reference to the following drawings, in which.

Figures 1, 2, 3, 4:
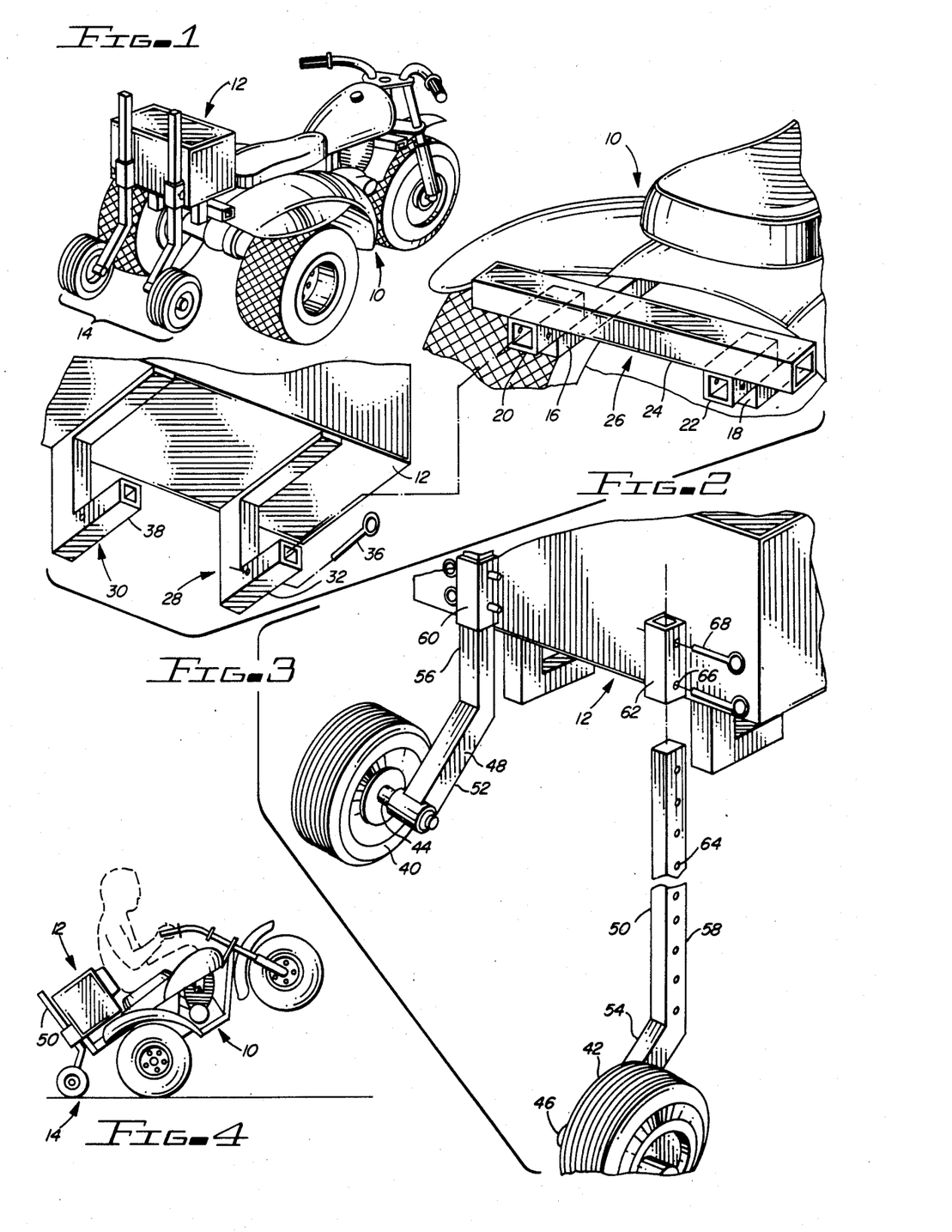
FIG. 1 is a perspective view of a threewheeled vehicle with tilt wheels and cargo carrier detachably attached to framework extending supports.
FIG. 2 is a combination view illustrating interconnection of integrated equipments with a three-wheeled vehicle.
FIG. 3 is a combination view illustrating the detachably attachable feature of tilt wheels.
FIG. 4 illustrates the operative function of attached tilt wheels.

Referring to FIG. 1, there is shown a representative three-wheeled vehicle 10 incorporating supports extending from the vehicle framework. These supports are adapted to receive and retain with quick disconnect fittings frame elements of various equipments detachably attachable to the vehicle.

Three-wheeled vehicles of the type illustrated are usually intended for recreational purposes. In pursuit thereof, they are driven over rough terrain and often in inhospitable and uninhabited areas. To ensure adequate fuel, provisions and first aid equipment for such an excursion, a cargo or baggage compartment for transport of such items is preferable. Moreover, rearward tipping of the vehicle is a constant danger in hilly areas and severe injuries to the driver may result therefrom. To accommodate these needs of a user of vehicle 10, supports for detachably attaching a cargo box 12 and a set of rearward tilt limiting wheels 14 are provided.

The structure attendant mounting and demounting of the cargo box and the set of wheels will be described with joint reference to FIGS. 2, 3 and 4. A pair of tubular members 16, 18 extend rearwardly from robust attachment points on the frame of the vehicle 10. Sections of tubing 20, 22 are welded or otherwise secured to members 16, 18, respectively, and structurally interconnected with one another by rigid attachment to transverse hollow bar 24. Hereinafter, the assembly including members 16, 18, sections 20, 22 and bar 24 may be referenced from time to time as rear support 26.

Cargo box 12 includes a pair of mounting members 28, 30. Each mounting member includes a stud 32, 34 which studs penetrably engage sections 20, 22, respectively. Pin means, such as pin 36, retain each of the studs within its respective section by penetrable engagement through mating apertures. It therefore becomes self-evident that cargo box 12 may be rapidly and facilely mounted and demounted.

A set of wheels 14 includes wheels 40, 42 rotatably supported upon axles 44, 46 extending from the lower end of legs 48, 50, respectively. Through experimentation, it has been found advantageous from a stability standpoint to displace the set of wheels rearwardly of the rear end of vehicle 10. Accordingly, each of legs 48, 50 includes a rearwardly extending slanted leg section 52, 54, depending from an upright leg section 56, 58, respectively. Sleeves 60, 62 are rigidly secured to cargo box 10 to slidably receive upright leg sections 56, 58, respectively. As shown with respect to upright leg section 58, each upright leg section includes a plurality of paired apertures 64. These apertures are located and spaced to permit coincidence with apertures 66 of sleeves 60, 62 and permit vertical positioning of the legs with respect to the sleeves. A selected vertical position is maintained rigid through a pin 68 penetrably engaging an upright leg section and its mating sleeve.

As particularly illustrated in FIG. 4, the degree of downward extension of legs 48, 50 with respect to cargo box 12 controls and delimits the rearward tilt angle of vehicle 10. As the vertical adjustment of set of wheels 14 is rapid and facile, changes in the permissible tilt angle are readily effected to comport with the train traversed. Moreover, the tilt angle permissible may be considered as a function of the degree of risk a rider is willing to undertake. It may be pointed out that over certain terrain, it may be preferable to have the drive wheels of the vehicle act the front wheels. This result can be achieved by adjusting the height of legs 48, 50 to permit the vehicle to rest upon set of wheels 14 in a stable state by a combination of rearward center of gravity shift and tilt angle. Usually from this position, a driver is able to lower the front wheel of the vehicle into contact with the ground by simply leaning forwardly.

From the above description of the embodiment illustrated in FIGS. 1 to 4, it will become apparent that cargo box 12 is usable for transport of fuel, provisions, first aid kit and other items possibly required on a journey into inhospitable or uninhabitable terrain. Additionally, the possibility of injury to the driver or damage to the vehicle is minimized by the set of wheels' capability for precluding rearward tip over.

Figures 5, 6, 7, 8, 9:
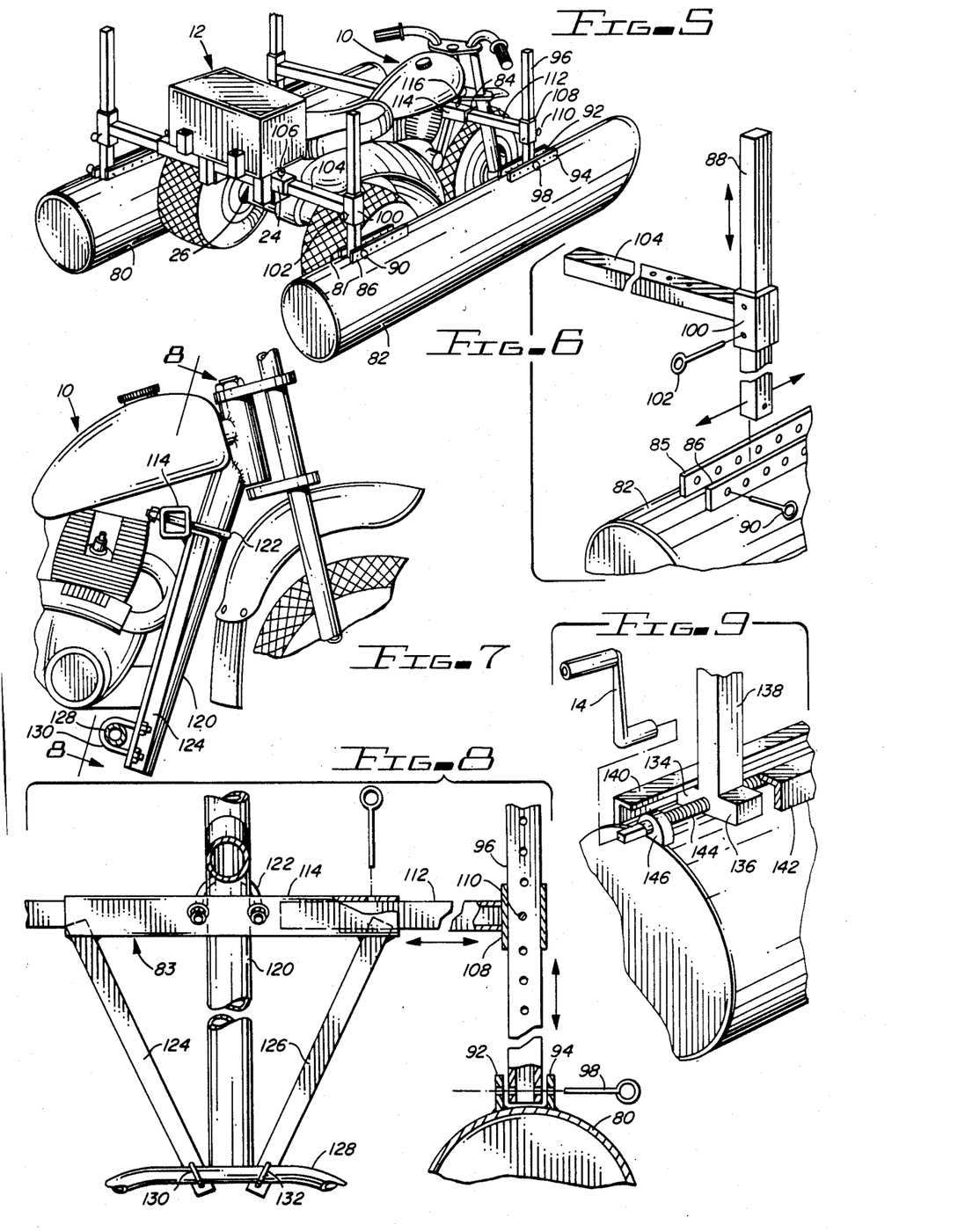
FIG. 5 is a perspective view illustrating pontoons integratably detachably attached to framework extending supports on a three-wheeled vehicle.
FIG. 6 is an exploded view illustrating attachment and adjustment features of the pontoons shown in FIG. 5.
FIGS. 7 and 8 illustrate supports attached to and extending from the frame of a three-wheeled vehicle.
FIG. 9 illustrates apparatus for fore and aft center of gravity adjustment for a pontoon mounted three-wheeled vehicle.

FIG. 5 illustrates equipment usable with vehicle 10 to convert it from a land vehicle to a waterborne vehicle. A pair of pontoons 80, 82 of suitable displacement to support vehicle 10 are readily detachably attachable to rear support 26 and front support 84. The front support is removably secured to the frame of the vehicle, as will be described in greater detail below.

Referring jointly to FIGS. 5, 6, 7 and 8, the pair of pontoons and supporting elements will be described in greater detail. For the sake of brevity, only one pontoon and its attendant supporting structure will be described since the other pontoon is essentially duplicative thereof. A pair of flanges 85, 86 extend upwardly from the rear top surface of pontoon 82 to receive therebetween a stanchion 88 secured by a pin 90 ot other quick disconnect feature. A plurality of positional adjustments extend along the flanges to permit fore and aft relocation of the pontoon commensurate with the load of vehicle 10 to maintain the center of gravity centrally positioned with respect to the lifting force provided by the pontoon. A similar pair of flanges 92, 94 extend from the top forward surface of pontoon 82 to support stanchion 96 secured to the flanges by pin means, such as pin 98. Flanges 92, 94 permit fore and aft relocation of stanchion 96 concurrent with adjustment of stanchion 88.

A collar 100 slidably receives stanchion 88 and may be positionally secured therealong by pin 102. The collar is rigidly secured to a rod 104, which rod is matingly attachable with bar 24 of rear support 26 through pin 106. As shown in FIG. 6, lateral adjustment or positioning of rod 104 with respect to rear support 26 is available.

A collar 108 slidably circumscribes stanchion 96 and is secureable therealong by pin 110. A rod 112 is attached to the collar and extends therefrom for mating engagement with bar 114 of forward support 84. A pin 116 positionally secures rod 112 with respect to its lateral extension from bar 114.

Forward support 84 will be dscribed with specific reference to FIGS. 7 and 8. Bar 114 is secured to vehicle frame member 120 by a U-bolt 122 or the like. Braces 124, 126 extend downwardly from opposed ends of bar 114 for removable attachment to a further frame member 128 of the vehicle. The means for attaching the braces may be through U-bolts 130, 132, as shown. Accordingly, the triangular orientation of the braces provide structural rigidity to bar 114 sufficient to support any equipment attached thereto.

As illustrated in FIG. 5, cargo box 12, at the user's option, may be secured to rear support 26 in the manner described previously whether or not the pontoons are employed.

When underway, the center of gravity of vehicle 10, when waterborne, may be shifted due to fuel consumption, disposal of provisions or for other reasons. And, while underway, it may be prudent to alter the longitudinal axes of pontoons 80, 82 with respect to the water surface to accommodate wave action, wind, forward speed or other forces. To accommodate a shift in the center of gravity or to bring about a different reorientation of the pontoons with respect to the water surface, a positioning adjustment mechanism shown in FIG. 9 may be employed with respect to each stanchion extending from each pontoon; alternatively, the adjustment mechanism may be ganged. In this variant, feet 134, 136 extending in opposed directions, are developed at the lower end of each of the stanchions, of which stanchion 138 is shown. These feet are retained in place by slidably engaging channels 140, 142. Fore and aft positioning of stanchion 138 is effected by a lead screw 144 threadably engaging the stanchion and positionally retained in place by an apertured ear 146. A removable crank 148 is engageable with the lead screw to turn it. Accordingly, by commensurate adjustments of the lead screw attendant each of the four stanchions, the longitudinal positional relationship between vehicle 10 and pontoons 80, 82 may be readily altered.

Motive power for the waterborne version of vehicle 10 is available by driving the rear wheels of the vehicle in the conventional manner. These wheels, usually have lug-like thread, which tread operate in the manner of a paddle wheel to impart a force against the water to move the vehicle forwardly. The degree of immersion of the wheels in the water is, of course, a function of the relative vertical position of the pontoons. In a preferred embodiment, the bottom of the wheels of vehicle 10 are maintained below the plane defined by the bottom of the pontoons which relationship permits the vehicle to be driven across land with the pontoons attached; launching and beaching of the vehicle is thereby made easy also. Positional adjusting means, like that shown in FIG. 9, may be employed to permit relative vertical adjustment between the vehicle and the pontoon when underway. Directionaly control in the water is provided to some extent by the steering action available from the water engaging front wheel. For vehicles having selective rear wheel braking, the resulting controllable rotation rate of each rear wheel may be used to augment directional control.

Figures 10, 11, 12, 13:
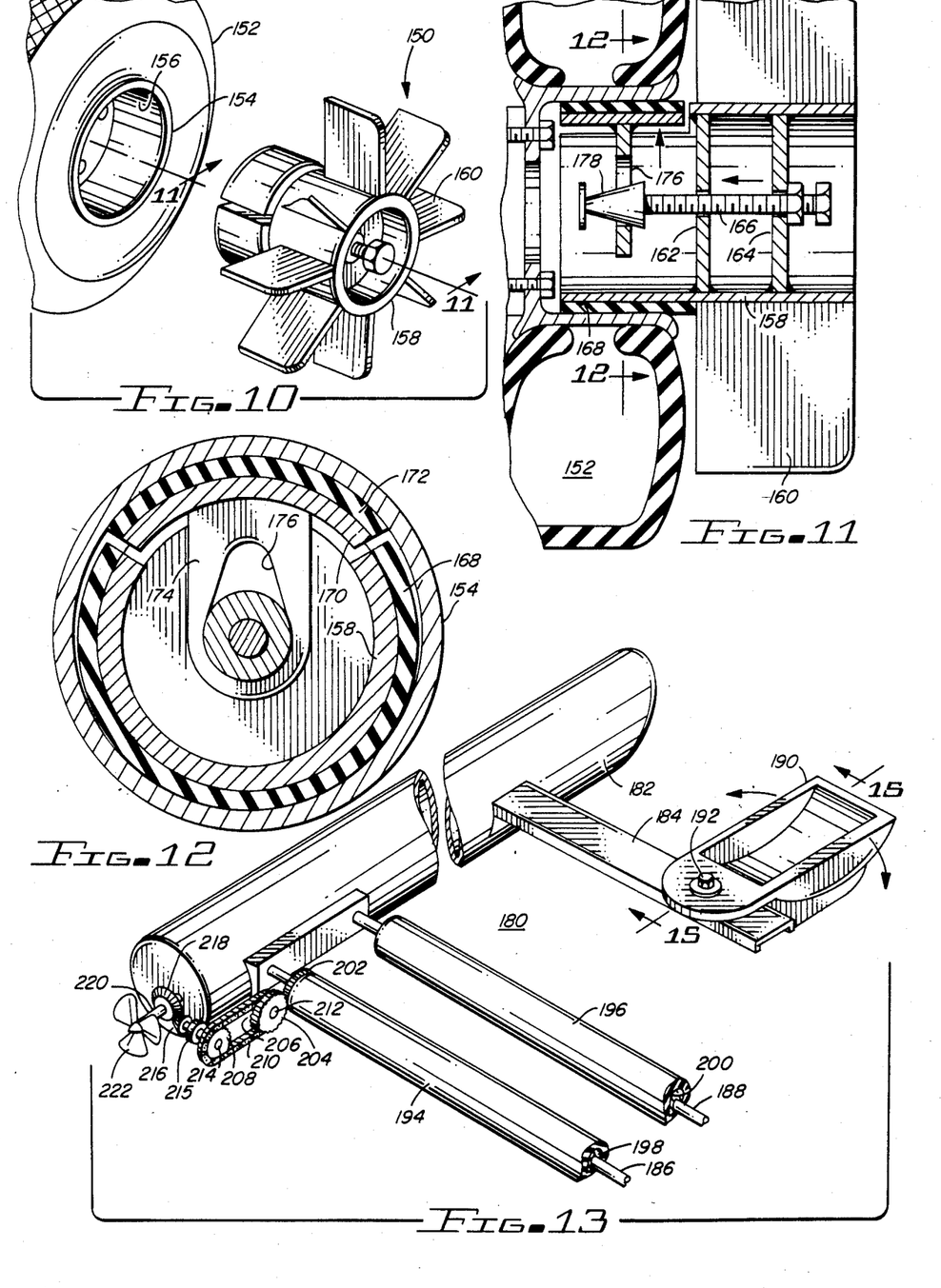
FIGS. 10, 11 and 12 illustrate hub mounted paddle wheels usable with a waterborne three-wheeled vehicle.
FIGS. 13 and 14 illustrate an alternate power transfer means for a pontoon supported three-wheeled vehicle.

FIGS. 10, 11 and 12 illustrate a hub mounted padded wheel 150 for providing forward propulsion to the configuration of the vehicle shown in FIG. 5. Most three-wheeled vehicles include balloon tires 152 and the tire supporting wheel 154 includes a recessed hub cavity 156. Paddle wheel 150 includes a cylinder 158 supporting each of paddles 160. Diametric supports or discs 162, 140 are attached interior of cylinder 158 and are centrally threadably apertured to receive threaded bolt 166. A sleeve 168 partially circumscribes cylinder 158, which sleeve is employed primarily to mate the paddle wheel assembly with the dimensions of cylinder cavity 156. Coincident cylinder segments 170, 172 of cylinder 158 and sleeve 168 are secured to one another and support an internal apertured tab 174. Aperture 176 in the tab is generally triangular shaped and radially oriented from the center of cylinder 158, as illustrated. A cone 178 if attached to the extremity of bolt 166 for penetrable engagement with aperture 176. By inspection, it will become apparent that translation of cone 178 as a result of rotation of bolt 166 and in consequence of the configuration of aperture 176 will result in forced radial displacement of tab 174 and its attached cylinder segments 170, 172. The resulting frictional engagement intermediate sleeve 168, sleeve segment 170 and the cylindrical wall defining davity 156 will retain paddle wheel hub assembly 150 in place and produce rotation of the paddle wheel commensurate with rotation of the wheel. Since paddle wheel 150 is more efficient in providing propulsive power than the tread of wheel 152, higher speeds and greater control may be achieved.

Referring momentarily to FIG. 5, it will become apparent that the lateral position of pontoons 80 and 82 may have to be adjusted to accommodate the paddle wheels attached to and extending from the rear wheels of the vehicle.

Figures 14, 15, 16:
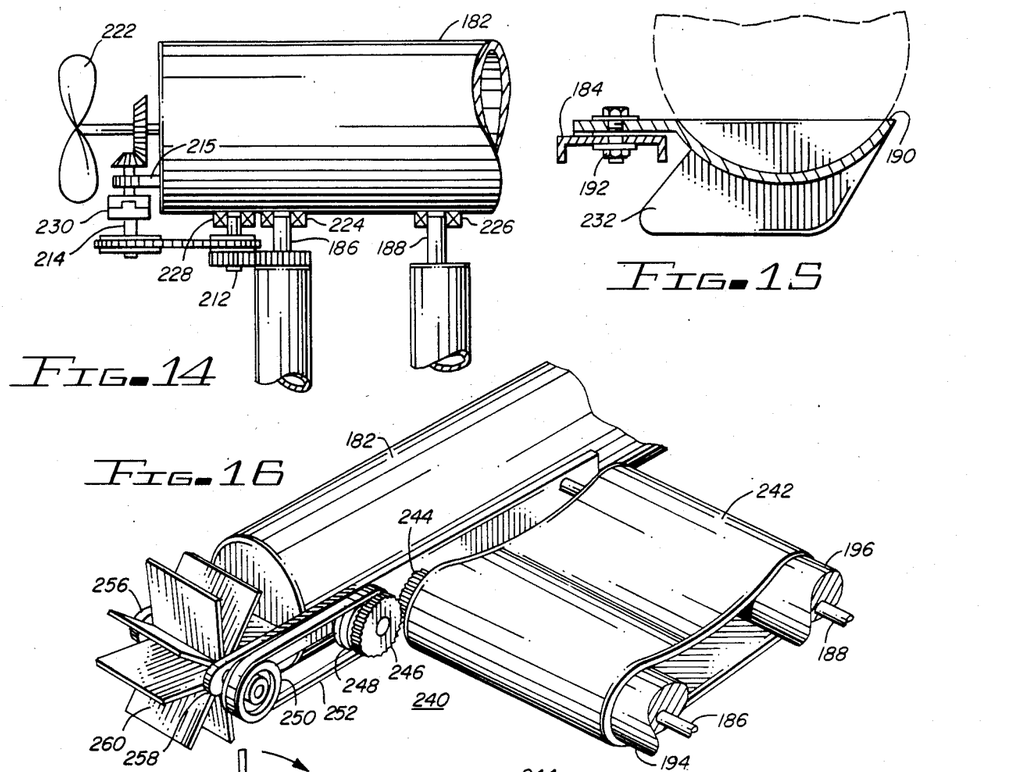
FIG. 15 is a cross-sectional view taken along lines 15—15, as shown in FIG. 13.
FIGS. 16 and 17 illustrate power transfer means for paddle wheel motive means for a pontoon supported three-wheeled vehicle.

Referring jointly to FIGS. 13, 14 and 15, there is illustrated a variant 180 of the pontoon system shown in FIG. 5. In the variant, pontoons 182 are rigidly secured to one another through cross member 184 and rods 186, 188. The front wheel of vehicle 10 is located within trough 190 pivotably secured to brace 184 through pivot means 192. Rollers 194, 196 are rotatably mounted upon rods 186, 188 through journals 198, 200. Rollers 194, 196 are displaced from one another and sized to permit support thereon of both rear wheels of vehicle 10. On energization of the motor of vehicle 10 and commensurate rotation of the rear wheels, rollers 195, 196 will rotate due to their frictional engagement with the wheels.

Roller 194 includes a gear 202 meshing with gear 204 to drive sprockets 206, 208 interconnected with chain 210. Suitably attached journals 212, 214 support the respective gear and sprockets. A first pinion gear 216 is secured to journal 214 mounted in pillow block 215 to mesh with a further pinion gear 218 secured to a rotatably mounted propeller shaft 220. A propeller 222 is supportd at the end of the propeller shaft. It is therefore evident that upon rotation of roller 194, such rotation is translated through the above described gear train to drive propeller 222 and provide propulsion for variant 180.

In the embodiment illustrated in FIG. 14, rods 186, 188 are mounted in bearings 224, 226 and shaft 212 is similarly monted in bearing 228. The structural support provided by these rods in variant 180 must be accommodated through brace 184 or further braces. In order to ameliorate damage to propeller 222 from inadvertent contact with rocks or other elements, a clutch 230 may be employed in conjunction with shaft 214.

Directional control of variant 180 is provided by a fin 232 extending downwardly from trough 190 and serving in the manner of a rudder, as shown in FIG. 15. Turning of the front wheel will reorient fin 232 longitudinally and bring about a change in direction of travel.

Figure 17:
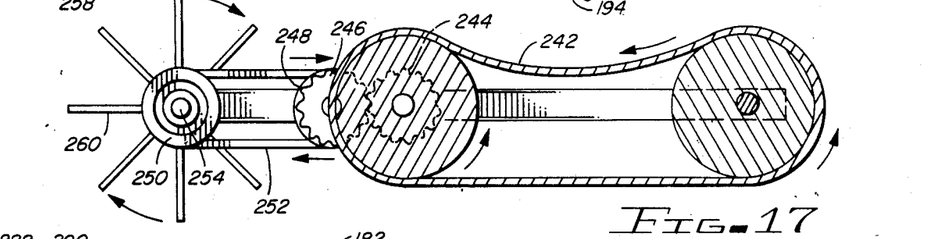

FIGS. 16 and 17 illustrate a further variant 240. Herein, rollers 194, 196 journaled upon rods 186, 188 respectively, support one or more endless belts 242. These belts are in frictional contact with the driving wheels of vehicle 10 and are caused to translate on rotation of the rear wheels. The resulting translation imparts a rotary motion to roller 194 and attached gear 244 meshing with gear 246. A pulley 248, secured to gear 246, drives a further pulley 250 through belt 252. A shaft 254 journaled in rearwardly extending arm 256 and penetrably rotatably mounted in rearwardly extending arm 258 is secured to pulley 250. A paddle wheel 260 is also secured to shaft 254. From this arrangement described, it will be apparent that translation of belt 242 will result in rotation of paddle wheel 260 to provide forward propulsion to variant 240.

Figure 18:
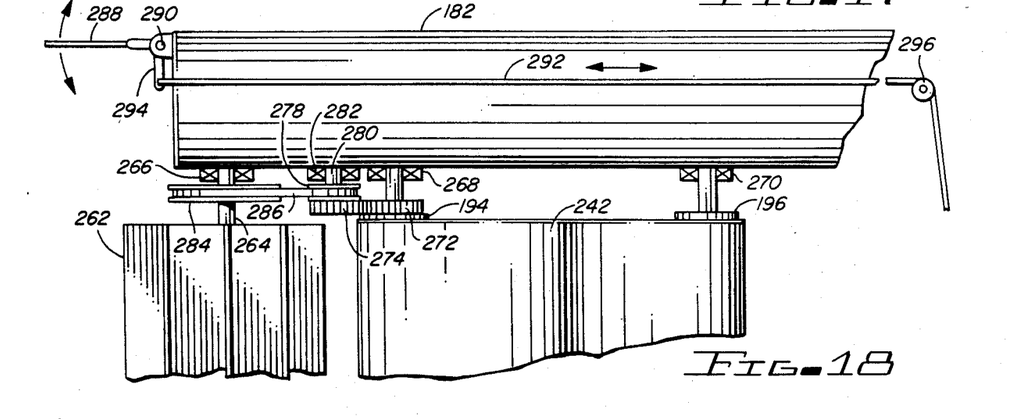
FIG. 18 illustrates a variant of the power transfer means for a paddle wheel.

FIG. 18 illustrates a further embodiment of variant 240. In this embodiment, a paddle wheel 262 extends intermediate pontoons 182 and is mounted upon shaft 264 journaled in bearings 266. Belt 242, supported intermediate shaft mounted rollers 194, 196 journaled in bearings 268, 270, respectively, drives meshing gears 272, 274. A pulley 276 attached to gear 274 and journaled on shaft 280 is rotatably mounted within bearings 282. A further pulley 284 mounted upon shaft 264 is interconnected with pulley 278 thruogh belt 286. Clearly, translation of belt 242 will result in commensurate rotation of paddle wheel 262 and provide forward propulsion.

Directional control for the embodiment shown in FIG. 17 may be provided by a rudder 288 pivotally attached to the rear of pontoons 282 through pivot means 290. Actuation of the rudder may be effected through a cord 292 extending from arm 294 and about rotatably mounted pulley 296 to the front wheel of the vehicle or trough 190. Necessarily, positive control of the rudder is limited to one direction corresponding with a pull on the cord; but, by use of one rudder on each pontoon and each being oppositely connected to the front wheel will provide positive rudder deflection in each direction.

Figures 19, 20, 21, 22:
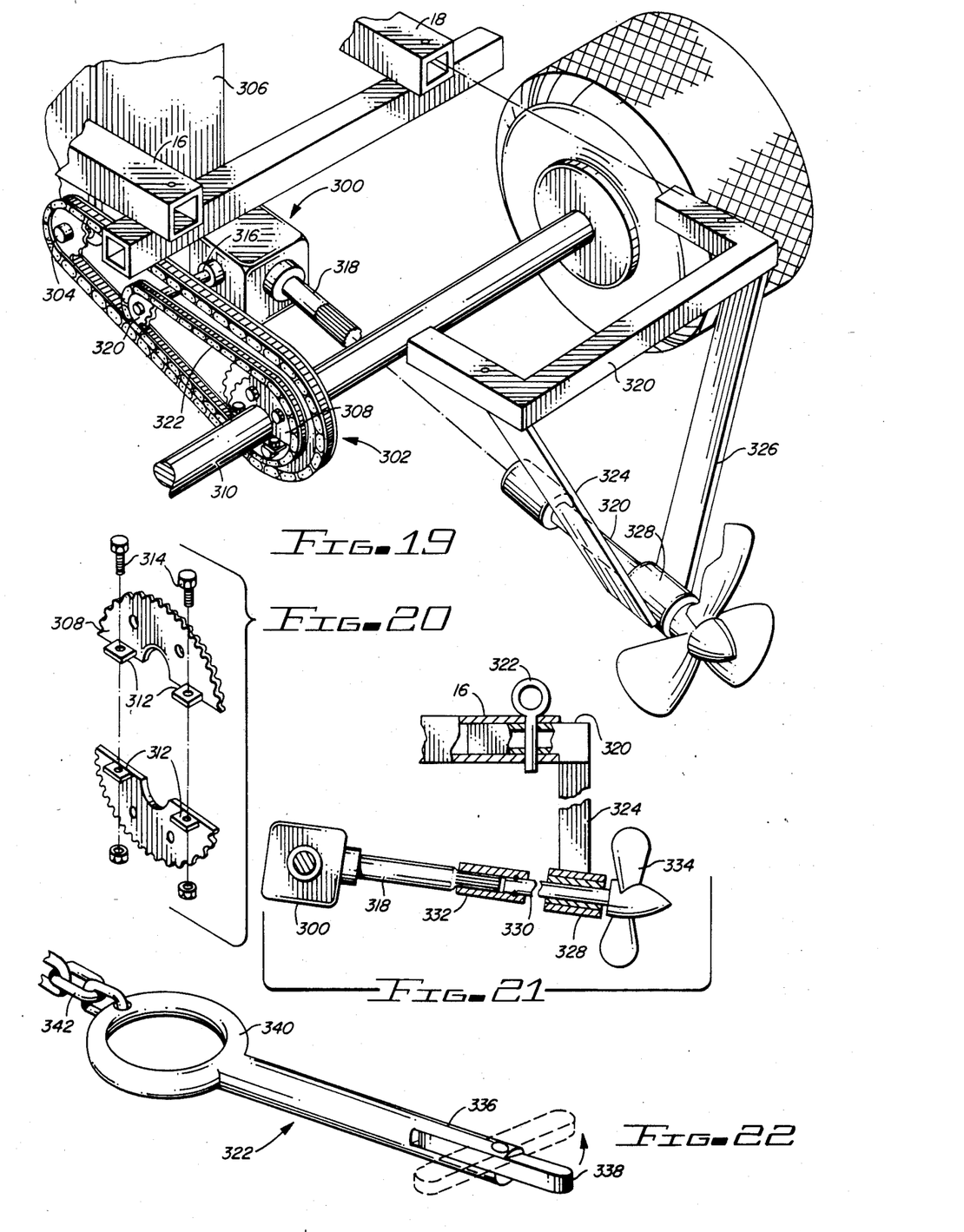
FIGS. 19, 20 and 21 illustrate an attached power takeoff unit usable with a detachably attached water motive means or ancillary equipment.
FIG. 22 illustrates a pin usable with the power takeoff unit and other detachable equipments.

Referring to FIG. 19, there is shown a partial view of the drive train attendant vehicle 10 and apparatus for adding a power take off unit 300. The existing drive train for vehicle 10 includes a sprocket and chain drive 302 extending rearwardly from output shaft 304 of engine 306. As paticularly shown in FIG. 20, a split sprocket 308 is attached to axle 310 supporting the wheels of the vehicle. Since such a sprocket is readily attachable to axle 310 by engaging mating tabs 312 with nut and bolt means 314, it may be attached by anyone with a modicum of mechanical skill. A commercially available gear box (designated as power take off unit 300) having an input shaft 216 and a splined output shaft 318 may be welded or otherwise secured to the frame of the vehicle. A sprocket 320 mounted upon the input shaft is interconnected with split sprocket 308 through chain 322. Accordingly, rotation of drive shaft 310 in response to operation of engine 306 will produce a commensurate rotation of input shaft 316 and of output shaft 318.

Not only may output shaft 318 be used to drive various ancilliary equipments, such as electric generators, etc., but it may be readily interconnected with a propulsion system for a waterborne variant of vehicle 10. As shown in FIGS. 19 and 21, a framework 320 can be developed to mate with sections 20, 22 or members 16, 18 (See also FIG. 1) and removably retained in place by pins 322 or the like. Braces 324, 326 extending downwardly from framework 320 support a journal 328 for rotatably supporting propeller shaft 330. The propeller shaft includes a splined cup disposed at one end for engaging the spline of output shaft 318 and a propeller 334 attached downstream of journal 328.

Further details of pin 322, which pin may be of the type readily usable in various other functions described above, is shown in FIG. 22. The pin includes a split end 336 pivotally supporting a bar 338. On alignment of the bar with a longitudinal axis of the pin, penetration of the apertures within the structures or members to be retained connected with one another may be readily effected. Withdrawal of the pin is precluded by rotating bar 338 out of alignment with the pin, as shown in dashed lines. A ring 340 disposed at the opposed end of the pin permits finger insertion and removal and facilitates handling of the pin. An attached chain 342 permits the securing of the pin to an adjacent member to prevent loss of the pin.

Equipment usable to permit operation of vehicle 10 upon snow will be described with joint reference to FIGS. 23 to 27. The primary support for the vehicle upon the snow is provided by a pair of skis located generally laterally coincident of the rear wheels. For purposes of brevity, only one of the skis will be described in detail. Ski 350 includes a pair of flanges 352, 354 for receiving a pivotally retained rod end 356 of a shock absorber 358; attachment may be by bolt and nut means 360, as illustrated. The other end of the shock absorber may be directly attached by welding or otherwise to stanchion 88 (See FIG. 5). The stanchion is secured to rear support 26 through collar 100 locked by pin 102 and bar 104 secured to the rear support through pin 106. This structure permits the raising and lowering of the ski with respect to the attendant rear wheel to permit greater or lesser penetration of the rear wheel into the underlying snow for traction purposes.

Figures 23, 24, 25, 26:
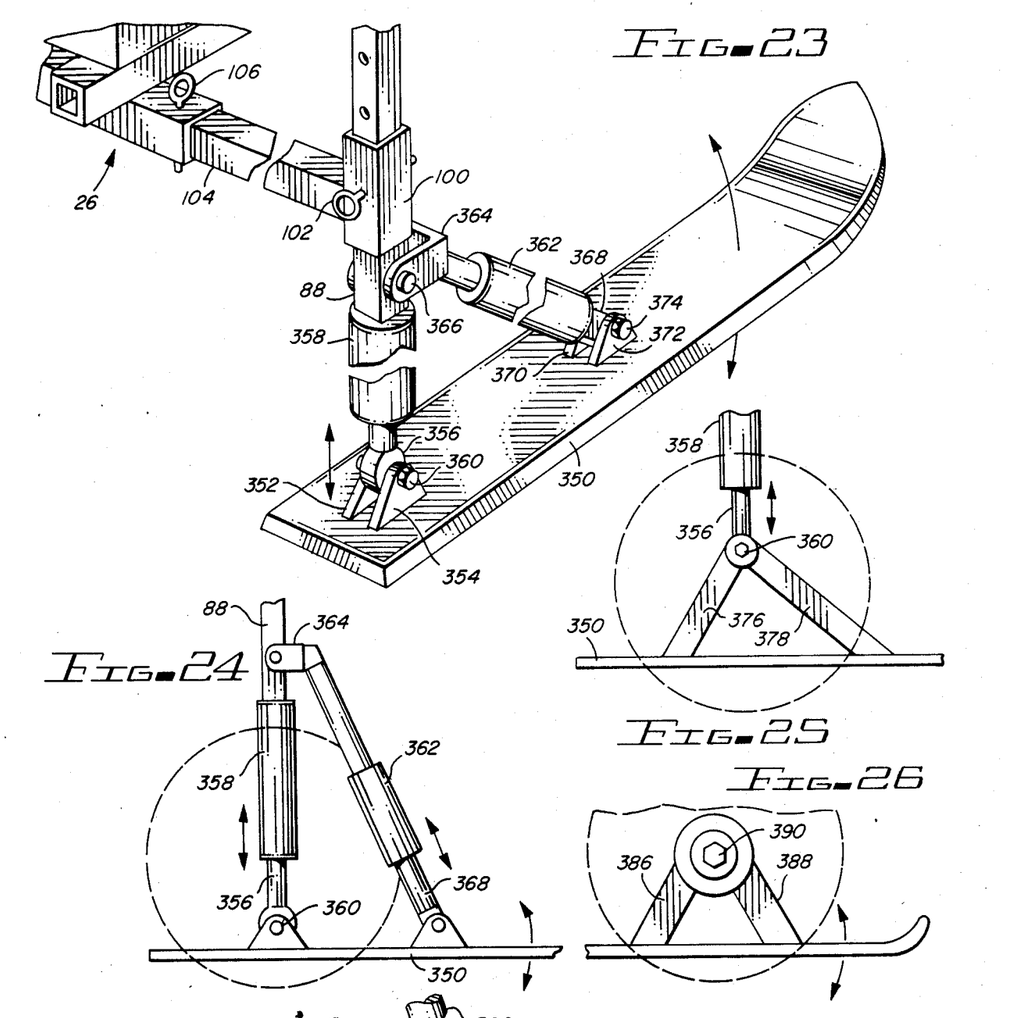
FIG. 23 illustrates a detachably attachable snow ski securable to frame extending supports of a three-wheeled vehicle.
FIGS. 24 and 25 illustrate variants for attaching the side skis.
FIGS. 26 and 27 illustrate a front wheel mounted ski for a three-wheeled vehicle.

Pivotal movement of ski 350 is necessary as a consequence of the generally uneven snow surface traversed but such pivotal movement should be damped for control purposes. A shock absorber 362 may be used for damping. A clevis 364 is secured to one end of the shock absorber for engagement with stanchion 88 through nut and bolt means 366. Rod end 368 at the other end of shock absorber 362 may be secured intermediate flanges 370, 372, by nut and bolt means 374.

From the above description and as particularly illustrated by the arrows in FIG. 24, ski 350 may be vertically adjustable with respect to the adjacent wheel and vertical loads imposed upon the ski will be damped by shock absorber 358. Moreover, the ski may pivot about nut and bolt means 360 which pivotal movement is damped by shock absorber 362.

A variant of the ski suspension system is illustrated in FIG. 25. Herein, angularly attached braces 376, 378 extend upwardly from ski 350 to engage rod end 356 of shock absorber 358 through nut and bolt means 360. The resulting structure permits initial vertical adjustment and damping of vertically imposed shock but pivotal movement is undamped.

Figure 27:
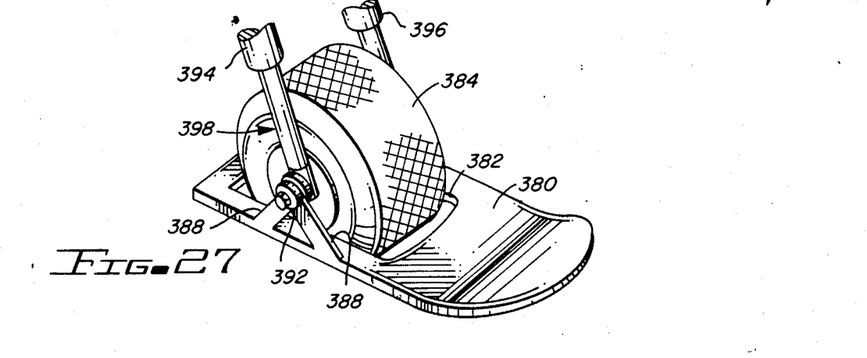

A ski 380 attached to the front wheel of the vehicle is illustrated in FIGS. 26 and 27. The ski includes an aperture 382 for penetrably receiving a portion of front wheel 384. Side braces 386, 388 extend from opposed lateral sides of the ski and penetratably receive the respective extremities of wheel support axle 390. Lock nuts 392 or the like maintain the braces pivotally secured to the axle. Damping of vertically imposed loads may be accommodated by shock absorbers 394, 396 disposed in conjunction with front wheel fork 398. Uneven snow surfaces traversed are accommodated by pivotal movement of the ski, as shown in FIG. 26.

It may be noted that the driving wheels extend below the undersurface of the side skis and thereby can provide a propulsion force to the snow borne vehicle. Protrusion of the front wheel through the aperture in the front ski provides some support against the snow surface and as the wheel is free to rotate, little drag is imposed. The extension of all three wheels beneath the respective skis permits the vehicle to traverse readily partially snow covered terrain without damage to the skis since contact with the uncovered terrain will be through the wheels and not the skis.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for converting an all terrain wheeled vehicle having front and rear wheels for travel across any of different surfaces by detachably attaching any of selected vehicle supporting equipment, said apparatus comprising in combination:
   (a) rear support means secured to the rear of the vehicle above and rearward of the axis of rotation of the rear wheels of the vehicle, said rear support means including first and second opposed ends oriented and located laterally of the centerline of the all terrain wheeled vehicle;
   (b) first and second horizontal extension means for engaging said first and second ends, respectively, said first and second ends including means for securing said first and second horizontal extension means;
   (c) first and second vertical stanchion means for interconnecting said first and second horizontal extension means, respectively, with the vehicle supporting equipment;
   (d) means for detachably attaching the lower ends of each of said first and second stanchion means to the vehicle supporting equipment;
   (e) first and second adjustment means disposed at the interconnections between said first and second horizontal extension means and said first and second stanchion means, respectively, for vertically adjusting the relationship between the rear of the vehicle and the rear of the vehicle supporting equipment;
   (f) a front support secured to the front of the vehicle above and rearward of the axis of rotation of the front wheel of the vehicle, said front support including third and fourth opposed ends oriented and located laterally of the centerline of the all terrain vehicle;
   (g) third and fourth horizontal extension means for engaging said third and fourth ends, respectively, said third and fourth ends including further means for securing said third and fourth horizontal extension means;
   (h) third and fourth vertical stanchion means for interconnecting said third and fourth horizontal extension means with the vehicle supporting equipment;
   (i) further means for detachably attaining the lower ends of said third and fourth stanchion means to the vehicle supporting equipment; and
   (j) third and fourth adjustment means disposed at the interconnection between said third and fourth horizontal extension means and said third and fourth stanchion means, respectively, for vertically adjusting the relationship between the front of the vehicle and the front of the vehicle supporting equipment.

2. The apparatus as set forth in claim 1 wherein each of said attaching means and said further attaching means for said first and second stanchions and for said third and fourth stanchions, respectivley, includes means for repositioning the vehicle supporting equipment forwardly and rearwardly with respect to the all terrain vehicle.

3. The apparatus as set forth in claim 2 wherein the vehicle supporting equipment comprises a pair of pontoons, one of said pair of pontoons being operatively associated with said first and third stanchions and the other of said pair of pontoons being operatively associated with said second and fourth pontoons.

4. The apparatus as set forth in claim 1 wherein each of said attaching means, said further attaching means, said first and second stanchion interconnecting means and said third and fourth stanchion interconnecting means comprises concentric tubing means and pin means for lockingly engaging said concentric tubing means.

* * * * *